(12) United States Patent
Tawara et al.

(10) Patent No.: US 8,062,113 B2
(45) Date of Patent: Nov. 22, 2011

(54) INFORMATION PROCESSING PROGRAM AND INFORMATION PROCESSING APPARATUS

(75) Inventors: Masaki Tawara, Kyoto (JP); Norichika Meguro, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1373 days.

(21) Appl. No.: 11/640,379

(22) Filed: Dec. 18, 2006

(65) Prior Publication Data

US 2008/0102912 A1    May 1, 2008

(30) Foreign Application Priority Data

Oct. 30, 2006   (JP) .................. 2006-294741

(51) Int. Cl.
  *A63F 9/24*   (2006.01)
  *A63F 13/00*   (2006.01)
  *G06F 17/00*   (2006.01)
  *G06F 19/00*   (2006.01)

(52) U.S. Cl. .................. 463/9; 463/22; 463/30; 463/31; 463/34; 463/37; 340/709; 340/712; 345/351; 345/425

(58) Field of Classification Search ................. 463/9, 22, 463/30, 31, 34, 37; 340/709, 712; 345/351, 345/425
See application file for complete search history.

(56) References Cited

U.S. PATENT DOCUMENTS

| | | | | |
|---|---|---|---|---|
| 4,310,839 | A | * | 1/1982 | Schwerdt ...................... 345/173 |
| 5,356,144 | A | * | 10/1994 | Fitzpatrick et al. ............. 463/22 |
| 5,606,632 | A | * | 2/1997 | Matsumoto et al. .......... 382/298 |

OTHER PUBLICATIONS

Pascal Ganaye, Solving Paint-by-numbers puzzle in C#, Aug. 11, 2005, Retrieved on Mar. 9 from http://www.codeproject.com/KB/cs/hanjie.aspx.*
"Picross 2", [online], Nintendo, the Internet <URL: http://www.nintendo.co.jp/n02/dmg/ap2j/index.html>.

* cited by examiner

*Primary Examiner* — David L Lewis
*Assistant Examiner* — Adetokunbo Torimiro
(74) *Attorney, Agent, or Firm* — Nixon & Vanderhye P.C.

(57) ABSTRACT

Of a region in a tabular form having a plurality of entries and squares related to the entries, a portion thereof including a square designated by a player is displayed on a screen. Next, information about an entry related to the designated square is obtained. The obtained entry is displayed in association with a display position of the designated square.

10 Claims, 16 Drawing Sheets

| COLUMN CLUE | | | | |
|---|---|---|---|---|
| COLUMN NUMBER 1 | NUMBER OF CLUES | CLUE VALUE 1A | ... | CLUE VALUE 1E |
| COLUMN NUMBER 2 | NUMBER OF CLUES | CLUE VALUE 2A | ... | CLUE VALUE 2E |
| ... | ... | ... | ... | ... |
| COLUMN NUMBER n | NUMBER OF CLUES | CLUE VALUE nA | ... | CLUE VALUE nE |

| ROW CLUE | | | | |
|---|---|---|---|---|
| ROW NUMBER 1 | NUMBER OF CLUES | CLUE VALUE 1A | ... | CLUE VALUE 1E |
| ROW NUMBER 2 | NUMBER OF CLUES | CLUE VALUE 2A | ... | CLUE VALUE 2E |
| ... | ... | ... | ... | ... |
| ROW NUMBER n | NUMBER OF CLUES | CLUE VALUE nA | ... | CLUE VALUE nE |

3441    3442    3443    3447

Fig.14
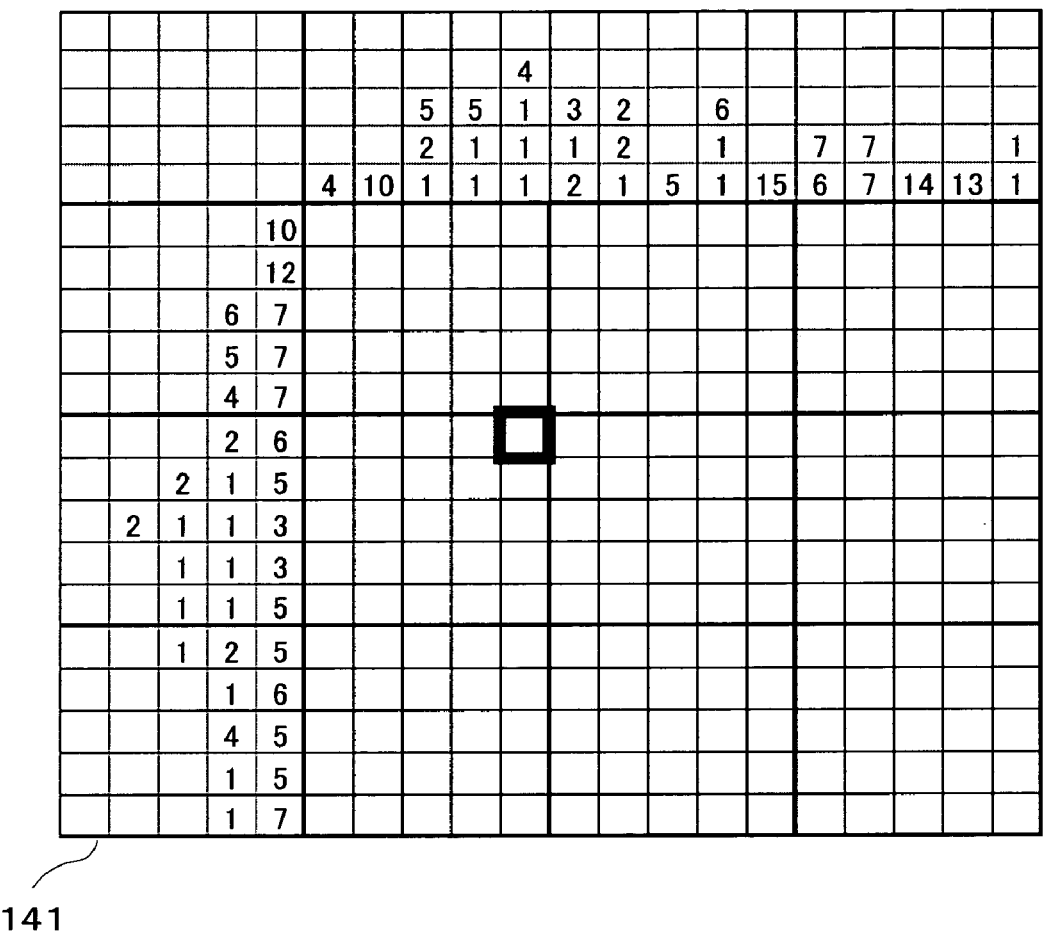
141
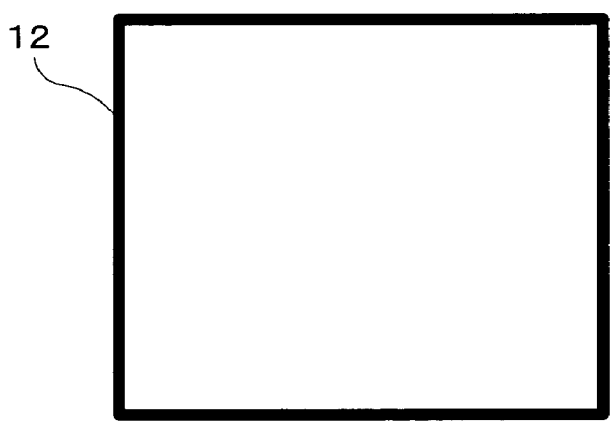
12

| )0 | 8,600 | 8,900 | 9,500 | 9,950 |
|---|---|---|---|---|
| )0 | 8,750 | 9,000 | 9,600 | 10,100 |
| )0 | 9,000 | 9,300 | 9,900 | 10,350 |
| 50 | 9,350 | 9,650 | 10,250 | 10,700 |
| )0 | 9,500 | 9,800 | 10,350 | 10,850 |
| )0 | 9,600 | 9,900 | 10,500 | 10,950 |
| 50 | 9,800 | 10,050 | 10,650 | 11,150 |

Fig.22

| | | KYOTO MINAMI | SUITA | NISHI-NOMIYA |
|---|---|---|---|---|
| )0 | 8,600 | | | |
| )0 | 8,750 | 9,000 | 9,600 | 10,100 |
| )0 | 9,000 | 9,300 | 9,900 | 10,350 |
| YOKOHAMA MACHIDA | | 9,650 | 10,250 | 10,700 |
| YOKOHAMA AOBA | | 9,800 | 10,350 | 10,850 |
| TOMEI KAWASAKI | | 9,900 | 10,500 | 10,950 |
| 50 | 9,800 | 10,050 | 10,650 | 11,150 |

221

_____ # INFORMATION PROCESSING PROGRAM AND INFORMATION PROCESSING APPARATUS

CROSS REFERENCE TO RELATED APPLICATION

The disclosure of Japanese Patent Application No. 2006-294741, filed Oct. 30, 2006, is incorporated herein by reference.

TECHNICAL FIELD

The exemplary embodiments disclosed herein relate to an information processing program and an information processing apparatus for displaying, on a screen of a display device, a region in which a plurality of entries and a plurality of squares related to the respective entries are represented in a tabular form. More specifically, the exemplary embodiments disclosed herein relate to a technique of displaying a portion of a display region in a tabular form on a screen.

BACKGROUND AND SUMMARY

Conventionally, there is known a type of puzzle games called "paint by numbers puzzles", in which squares in a grid having a plurality of rows and columns are filled in accordance with numbers (clue numbers) given for each row and column to reveal a hidden picture (or characters). There are also known game programs and game machines which enable such puzzle games to operate in electronic game machines (e.g., "Picross 2", [online], Nintendo, [searched on Sep. 13, 2006], the Internet <URL: http://www.nintendo.co.jp/n02/dmg/ap2j/index.html> (hereinafter referred to as Non-Patent Document 1)). In the game program, a grid having 15×15 squares, and clue numbers at the top and left of the grid, are displayed. Also, a technique of magnifying clue numbers corresponding to a square which a player wants to fill is disclosed therein.

However, in the game program disclosed in Non-Patent Document 1 above, there are conventionally the following problems. The game disclosed in Non-Patent Document 1 is sufficiently enjoyable when a grid has an area of as small as 15×15. Therefore, small screen sizes of hand-held game machines can secure visibility even when the whole grid area is displayed. In recent years, there is a demand for advanced and complicated game contents, since the performance of hardware has been increased (the screen can display a high resolution), players have become accustomed to games, and the like. For example, a larger game area, such as a grid of 25×30 squares or the like, is required. However, when the entirety of such a game area is displayed on the small screen of the hand-held game machine, each square is displayed in a considerably small size, resulting in a significant reduction in visibility and operability. It is here considered that a portion of the area may be magnified and displayed. In this case, the visibility is certainly improved. However, clue numbers, which are information required to clear the game, are not displayed on the screen, depending on the magnified portion, so that a meaning or a content of the magnified portion cannot be recognized. As a result, the level of enjoyment of the game is impaired.

Therefore, a feature of certain exemplary embodiments is to provide an information processing program and an information processing apparatus which perform an information process of displaying a portion of a region in a tabular form which has a size larger than that of a screen, and with which the meanings and contents of squares in the displayed partial region can be recognized while increasing the visibility and the operability.

Certain exemplary embodiments have the following aspects to attain the feature mentioned above. Note that reference numerals, additional descriptions and the like inside parentheses indicate exemplary correspondence to exemplary embodiments described below for the sake of easy understanding, and are not intended to be limiting in any way.

A first aspect is directed to a storage medium storing an information processing program which is executed by a computer of an information processing apparatus for displaying on a screen of a display device an entire region in which a plurality of entries and a plurality of squares related to the respective entries are represented in a tabular form, the information processing program causing the computer to execute a designation step (S2), a partial region displaying step (S5), an entry obtaining step (S34), and an entry displaying step (S35, S36 and S38). The designation step designates any square from the plurality of squares. The partial region displaying step displays on the screen a portion of the entire region including the designated square. The entry obtaining step obtains the entry related to the square designated in the designation step. The entry displaying step displays the entry obtained in the entry obtaining step in association with a display position of the designated square. As used herein, the term "entry" refers to a general table entry, or an entry indicating information about a square displayed on an upper portion and a left portion of a region in a tabular form, such as clue numbers in a paint by numbers puzzle.

A second aspect based on the first aspect, the entry displaying step includes displaying the entry obtained in the entry obtaining step at least either above or to the left of the display position of the designated square.

A third aspect based on the first aspect, the information processing program causes the computer to further execute a determination step of determining whether or not the entry obtained in the entry obtaining step is within the partial region. The entry displaying step includes moving the entry into the partial region when it is determined that the entry is not within the partial region.

A fourth aspect based on the first aspect, the entry obtaining step includes obtaining the entries related to squares adjacent to, and above and below or to the left and right of, the designated square. The entry displaying step includes displaying the entry related to the designated square and the adjacent entries.

A fifth aspect based on the first aspect, the entry displaying step includes changing a character size or a character color of the entry obtained in the obtaining step and displaying the resultant entry.

A sixth aspect based on the first aspect, the designation step including designating the predetermined square based on designated coordinates corresponding to a position designated by a player on a touch panel provided on the screen of the display device.

A seventh aspect based on the first aspect, the entry obtaining step includes erasing a portion of the entry related to the designated square from the entire region.

An eighth aspect based on the first aspect, the entry displaying step includes displaying the entry in a manner which disposes the entry along an upper end or a left end of the screen.

A ninth aspect based on the first aspect, an information process executed by the information processing program is a paint by numbers puzzle game, the entire region is a paint by numbers puzzle, and the entry is clue information for solving the paint by numbers puzzle.

A tenth aspect is directed to an information processing apparatus (10) for displaying on a screen of a display device an entire region in which a plurality of entries and a plurality of squares related to the respective entries are represented in a tabular form, the apparatus comprising a designation input section (16 and 31), a partial region displaying section (31), an entry obtaining section (31), and an entry displaying section (31). The designation input section inputs a designation for designating any square from the plurality of squares. The partial region displaying section displays on the screen a portion of the entire region including the designated square. The entry obtaining section obtains the entry related to the square designated in the designation section. The entry displaying section displays the entry obtained in the entry obtaining section in association with a display position of the designated square.

According to the first aspect, when a portion of a region in a tabular form having a size larger than that of a display screen is displayed, an entry for a square designated by a player of squares displayed on the screen can be invariably displayed on the screen. Therefore, in addition to good visibility and operability of the tabular-form region, information about the square designated by the player can be easily recognized. As a result, a comfortable game play environment can be provided to a player. Also, only a minimum required amount of information can be displayed, thereby making it possible to effectively utilize a large display region of the screen.

According to the second aspect, an entry for a square designated by a player can be displayed either above or to the left of the square. Thereby, information about the square designated by the player can be easily intuitively recognized.

According to the third aspect, it is possible to prevent double display of an entry.

According to the fourth aspect, entries for squares around a square designated by a player are also displayed. Therefore, information can be more easily recognized.

According to the fifth aspect, a character of an entry can be displayed noticeable. Thereby, it is possible to enable a player to intuitively recognize the meaning or content of a square designated by the player.

According to the sixth aspect, it is possible to achieve an intuitive designation operation, resulting in an improvement in operability.

According to the seventh aspect, it is possible to prevent a deterioration in visibility due to double display of an entry.

According to the eighth aspect, an entry can be displayed while preventing the entry from overlapping a designated square.

According to the ninth aspect, both visibility and operability can be improved in a paint by numbers puzzle game. Also, a screen paint by numbers puzzle having a large region can be comfortably played irrespective of the size, resulting in an increase in enjoyment of the game.

According to the information processing apparatus of the certain exemplary embodiments described herein, an effect similar to that of the information processing program of the certain exemplary embodiments can be obtained.

These and other features, aspects and advantages will become more apparent from the following detailed description when taken in conjunction with the accompanying drawings.

BRIEF DESCRIPTION OF THE DRAWINGS

FIG. 10 is a diagram illustrating an exemplary data structure of a column clue 343 of FIG. 8;

FIG. 11 is a diagram illustrating an exemplary data structure of a row clue 344 of FIG. 8;

FIG. 14 is a diagram for describing large screen coordinates;

FIG. 18 is a diagram for describing a relationship between a large background and a clue object;

FIG. 19 is a diagram for describing a relationship between a large background and a clue object;

FIG. 21 is a diagram illustrating a fee table to which certain exemplary embodiments are applied; and FIG. 22 is a diagram illustrating a fee table to which certain exemplary embodiments are applied.

DETAILED DESCRIPTION

Hereinafter, exemplary embodiments will be described with reference to the accompanying drawings. Note that these exemplary embodiments are not restricted by the description below.

Figure 1:
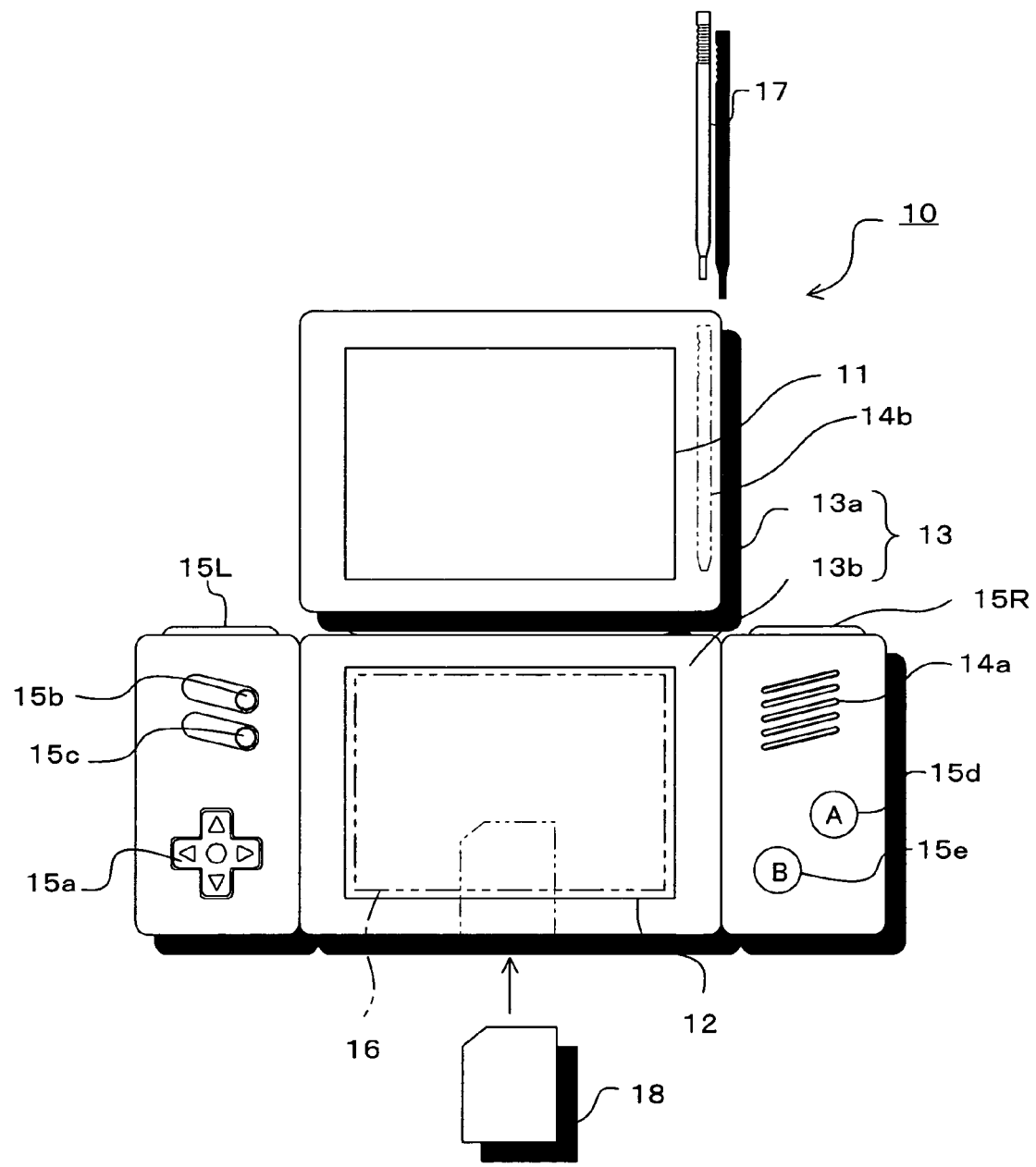
FIG. 1 is an external view of a hand-held game apparatus 10 according to a first exemplary embodiment.

FIG. 1 is an external view of a hand-held game apparatus which is an exemplary information processing apparatus according to certain exemplary embodiments. In FIG. 1, the hand-held game apparatus 10 of this example comprises two liquid crystal display devices (LCDs) 11 and 12, which are disposed at predetermined positions and are housed in a housing 13. Specifically, when the first liquid crystal display device (hereinafter referred to as an "LCD") 11 and the second LCD 12 are vertically disposed and housed, the housing 13 comprises an upper housing 13a and a lower housing 13b, and the upper housing 13a is supported at a portion of an upper side of the lower housing 13b in a manner which allows the upper housing 13a to swing. The upper housing 13a has a planar shape slightly larger than that of the first LCD 11. An opening portion is formed in a major surface of the housing 13a to expose a display surface of the LCD 11. The lower housing 13b has a planar shape wider than that of the upper housing 13a. An opening portion is formed at substantially a middle portion in a lateral direction of the housing 13b to expose a display surface of the LCD 12. A sound hole 14a is formed on any one of left and right sides of the LCD 12. An operation switch portion 15 is attached to the left and right sides of the LCD 12.

The operation switch portion 15 includes a direction designating switch 15a, a start switch 15b and a select switch 15c, which are attached on the left side of the LCD 12 and on a major surface of the lower housing 13b, and action switches 15d and 15e, which are attached on the right side of the LCD 12 and on the major surface of the lower housing 13b. The direction designating switch 15a is used to designate a movement direction of a player object (or a player character) which can be operated by a player, a movement direction of a cursor, or the like. The action switches 15d and 15e are used to designate an action other than designation of directions, such as "jump", "punch", "move a weapon" or the like in action games, or "get an item", "select and confirm a weapon or a command" or the like in role playing games (RPGs) or simulation role playing games (SRPGs). In addition, optionally, an additional action switch may be provided, or side switches 15L and 15R may be provided on an upper surface (upper side surface) of a region of the lower housing 13b to which the operation switch portion 15 is attached.

A touch panel 16 is attached to an upper surface of the LCD 12. The touch panel 16 may be of any type including, for example, a resistance film type, an optical (infrared) type, and an electrostatic capacitance coupling type. The touch panel 16 detects a coordinate position of a stylus pen 17 (or a finger may be used) and outputs coordinate data when the stylus pen 17 presses, moves or sweeps an upper surface of the touch panel 16.

A holding hole 14b for holding the stylus pen 17 for operating the touch panel 16 is formed in the vicinity of a side surface of the upper housing 13a. The stylus pen 17 is held in the holding hole 14b. A cartridge insertion portion (not shown) for detachably connecting a memory card 18 with a built-in memory (e.g., a ROM) storing a game program is formed in a portion of a side surface of the lower housing 13b. A connector (not shown) for electrically connecting to the memory card 18 is provided inside the cartridge insertion portion. The lower housing 13b (or the upper housing 13a may be used) also houses an electronic circuit board (30 in FIG. 2 described below) on which various electronic parts (e.g., a CPU, etc.) are mounted. Note that the information storage medium for storing a game program is not limited to nonvolatile semiconductor memories, such as ROMs and flash memories, and may be a CD-ROM, a DVD, or other similar optical disc-shaped storage media.

Figure 2:
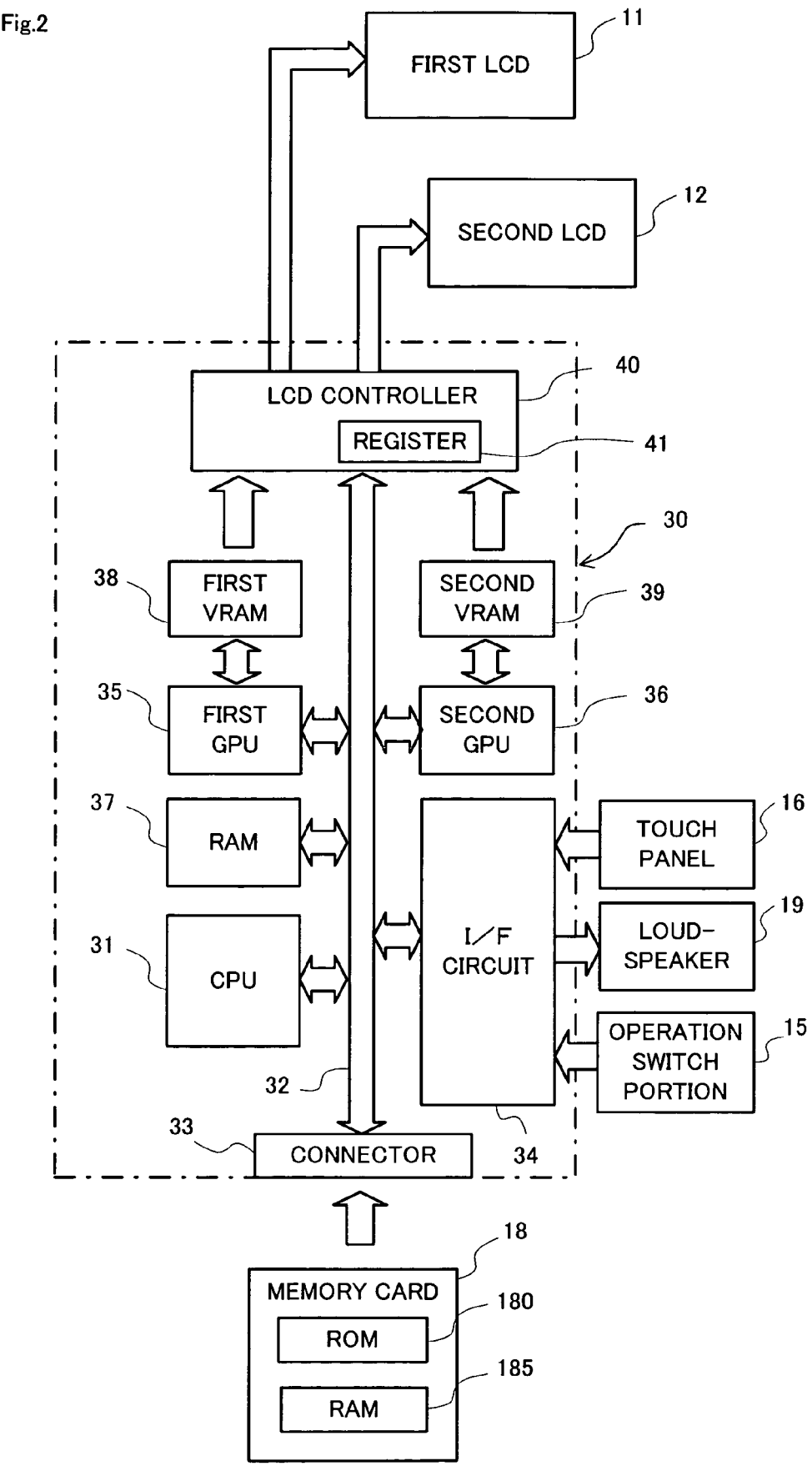
FIG. 2 is a block diagram illustrating the hand-held game apparatus 10 of the first exemplary embodiment.

FIG. 2 is a block diagram illustrating the hand-held game apparatus 10. In FIG. 2, a CPU 31 is mounted on the electronic circuit board 30 housed in the housing 13. A connector 33, and in addition, an I/O interface (I/F) circuit 34, a first graphics processing unit (first GPU) 35, a second graphics processing unit (second GPU) 36, a RAM 37, and an LCD controller 40, are connected via a bus 32 to the CPU 31. The memory card 18 is detachably connected to the connector 33. The memory card 18 is a storage medium for storing a game program. Specifically, the memory card 18 carries a ROM 180 storing the game program and a RAM 185 for storing rewritable backup data. The game program stored in the ROM 180 of the memory card 18 is loaded into the RAM 37, and the game program loaded in the RAM 37 is executed by the CPU 31. The CPU 31 stores temporary data which is generated by executing the game program, or data for generating an image, into the RAM 37. The operation switch portion 15 and the touch panel 16, and in addition, a loudspeaker 19, are connected to the I/F circuit 34. The loudspeaker 19 is provided under the sound hole 14a.

A first video RAM (first VRAM) 38 is connected to the first GPU 35, while a second video RAM (second VRAM) 39 is connected to the second GPU 36. The first GPU 35 generates a first game image based on data for generating an image which is to be stored into the RAM 37 in accordance with an instruction from the CPU 31, and draws the first game image into the first VRAM 38. The second GPU 36 generates a second game image based on data for generating an image which is to be stored into the RAM 37 in accordance with an instruction from the CPU 31, and draws the second game image into the second VRAM 39. The first VRAM 38 and the second VRAM 39 are connected to the LCD controller 40.

The LCD controller 40 includes a register 41. The register 41 stores a value of 0 or 1 in accordance with an instruction from the CPU 31. When the value of the register 41 is 0, the LCD controller 40 outputs the game image drawn in the first VRAM 38 to the LCD 11, and the game image drawn in the second VRAM 39 to the LCD 12. When the value of the register 41 is 1, the LCD controller 40 outputs the game image drawn in the first VRAM 38 to the second LCD 12, and the game image drawn in the second VRAM 39 to the first LCD 11.

The I/F circuit 34 is a circuit which transfers data between an external I/O device (e.g., the operation switch portion 15, the touch panel 16, the loudspeaker 19, etc.) and the CPU 31. The touch panel 16 (including a device driver for the touch panel) outputs position coordinate data corresponding to a position input (designated) by the stylus pen 17. Note that, in this example, the display screen has a resolution of 256 dots×192 dots, while the touch panel 16 has a detection precision of 256 dots×192 dots corresponding to the display screen. Alternatively, the detection precision of the touch panel 16 may be either lower or higher than the resolution of the display screen.

Figure 3:
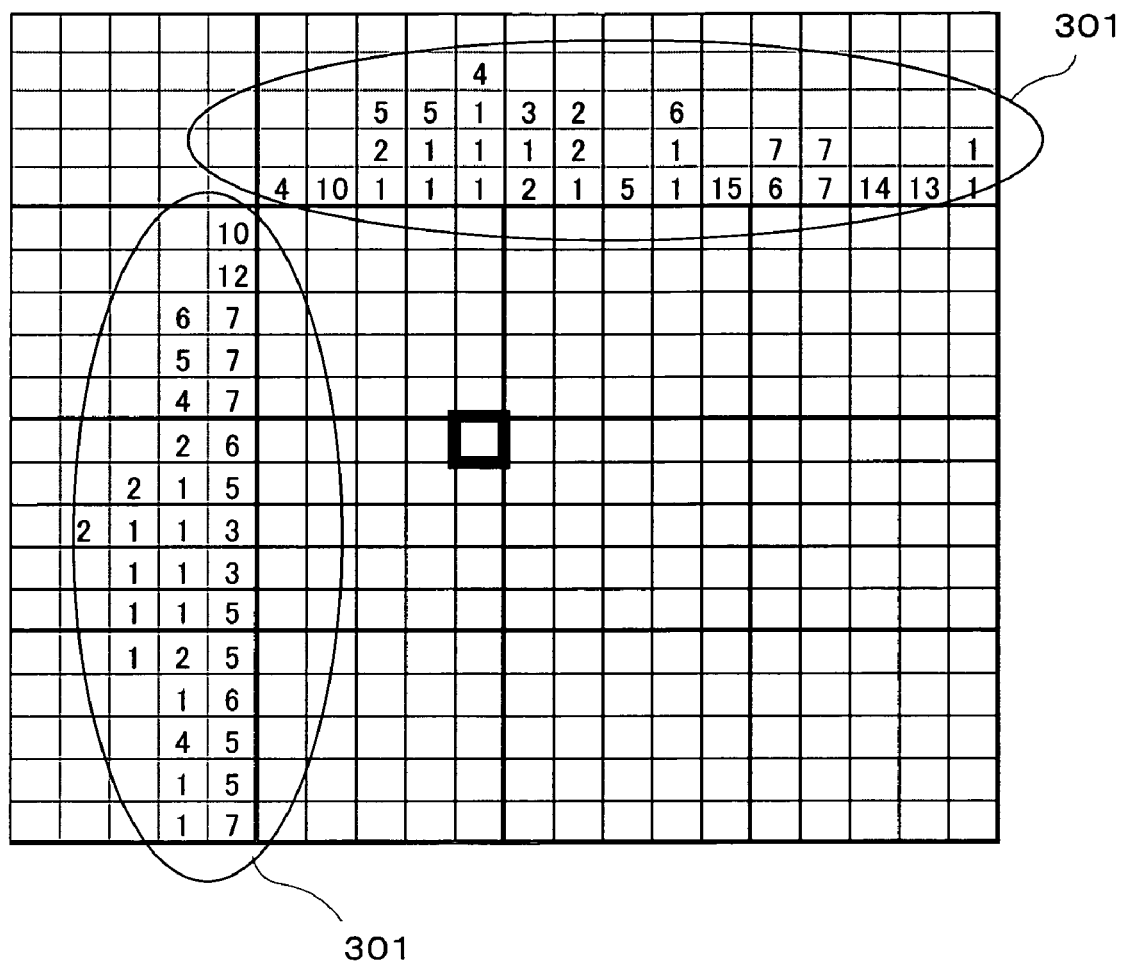
FIG. 3 is a diagram illustrating an exemplary screen of a game assumed in the first exemplary embodiment.

Next, an outline of a game assumed in this embodiment will be described with reference to FIGS. 3 to 6. FIG. 3 illustrates an exemplary screen of the game assumed in this embodiment. The game is a so-called paint by numbers puzzle in which squares are filled in black in accordance with clue numbers as clues to complete a picture. In FIG. 3, the entirety of the puzzle is displayed and accommodated on the screen. In FIG. 3, clue numbers 301 each represent the number of black squares on a corresponding column or row. For example, "3" represents that there are three consecutive black squares in a corresponding column or row. Also, "2 1" represents that there are two consecutive black squares and one square in this order. Note that, when there are two or more numbers, there must be at least one blank square between each group of black squares. A player determines whether or not a square is to be filled in black, using the clue numbers 301 displayed on the upper and left sides as clues. The player fills squares in black as appropriate.

Figure 4:
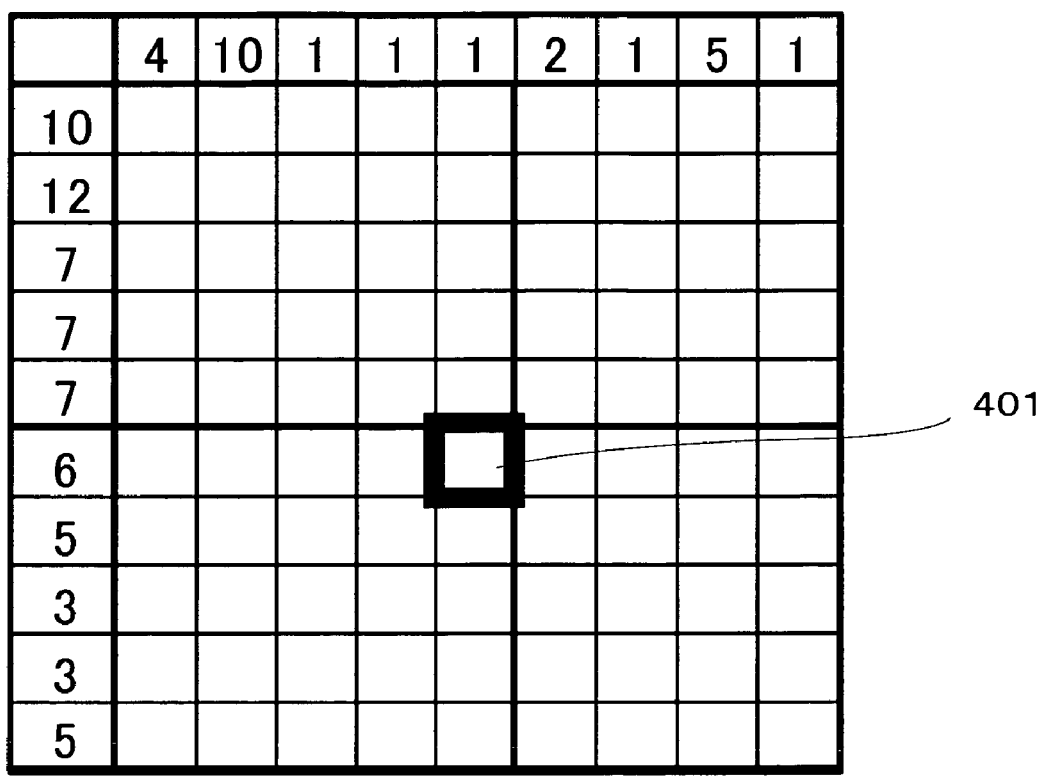
FIG. 4 is a diagram illustrating an exemplary screen of the game assumed in the first exemplary embodiment.

Next, an outline of the process of this embodiment will be described. When the screen as illustrated in FIG. 3 is displayed on the second LCD 12, the player designates a square which the player wants to magnify, using the stylus pen 17 or a finger (touch operation). In response to this, as illustrated in FIG. 4, a region including a designated square (hereinafter square of interest) 401 is magnified and displayed. Here, in this embodiment, a background used in magnification (hereinafter referred to as a large background) is prepared apart from a background used in a normal state (hereinafter referred to as a normal background). For example, if the screen resolution is 256×192 dots, a normal background having a size (e.g., 256×192 dots) which allows the normal background to be accommodated in the screen, and a large background having a size (e.g., 512×384 dots) which is two times larger than the size of the normal background, are previously prepared. When a magnification process is performed, the normal background is changed to the large background, which is in turn displayed. This is because, if a magnified normal background is directly displayed on the screen, the dots are rough and the appearance is poor. Therefore, an additional background specialized for magnification is prepared as a substitution.

Figure 5:
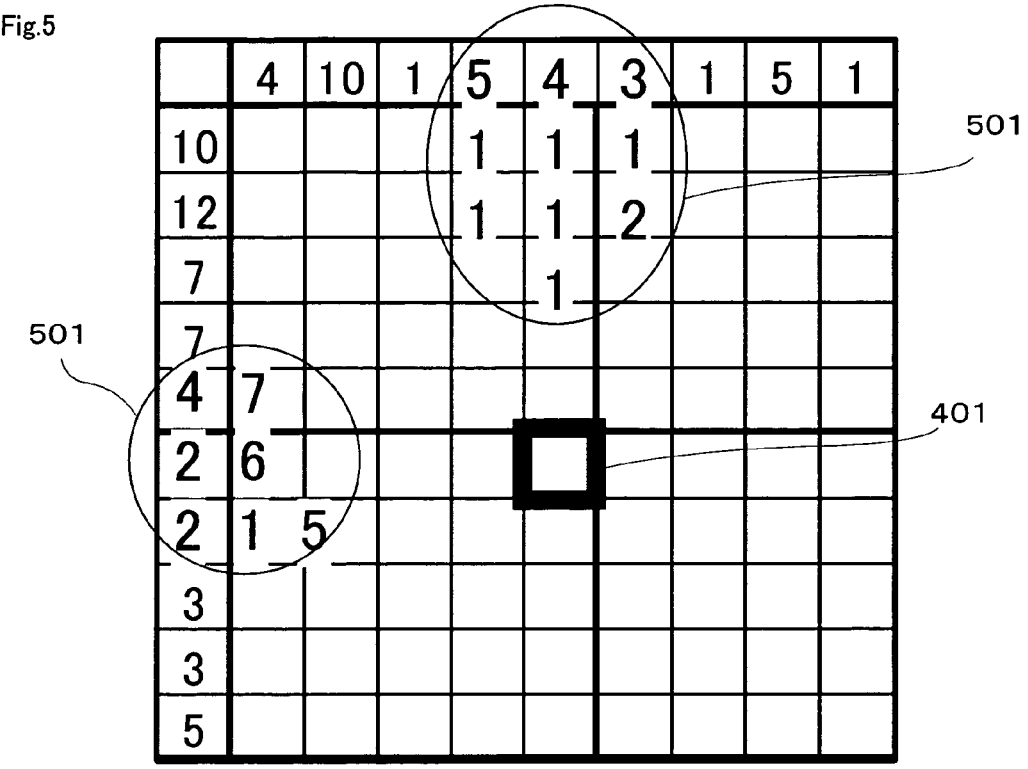
FIG. 5 is a diagram illustrating an exemplary screen of the game assumed in the first exemplary embodiment.
Figure 6:
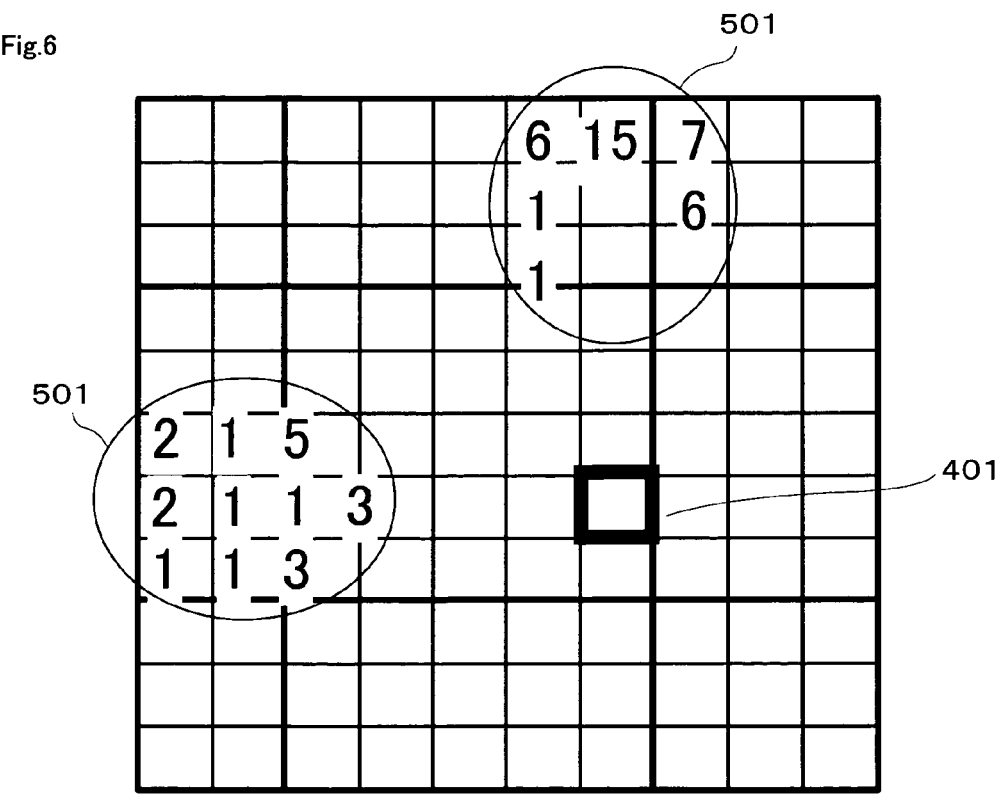
FIG. 6 is a diagram illustrating an exemplary screen of the game assumed in the first exemplary embodiment.

When such magnification is performed, clue numbers 501 for the square of interest 401 and rows and columns immediately adjacent to, and to the left and right of and above and below the square of interest 401, are also displayed on an upper portion and a left portion of the screen, as illustrated in FIG. 5. In this situation, if the screen is scrolled and another square is designated as a square of interest 401, clue numbers 501 are displayed, depending on the newly set square of interest 401, as illustrated in FIG. 6. If the player issues a reduction command in the magnified display state, the screen returns to the normal background as illustrated in FIG. 3.

As described above, in this embodiment, even when the screen is magnified, clue numbers for a square of interest are invariably displayed. Therefore, it is easy for the player to determine whether to fill the square in black. In addition, since the screen is magnified, it is easy to designate a square, thereby increasing the operability.

Figure 7:
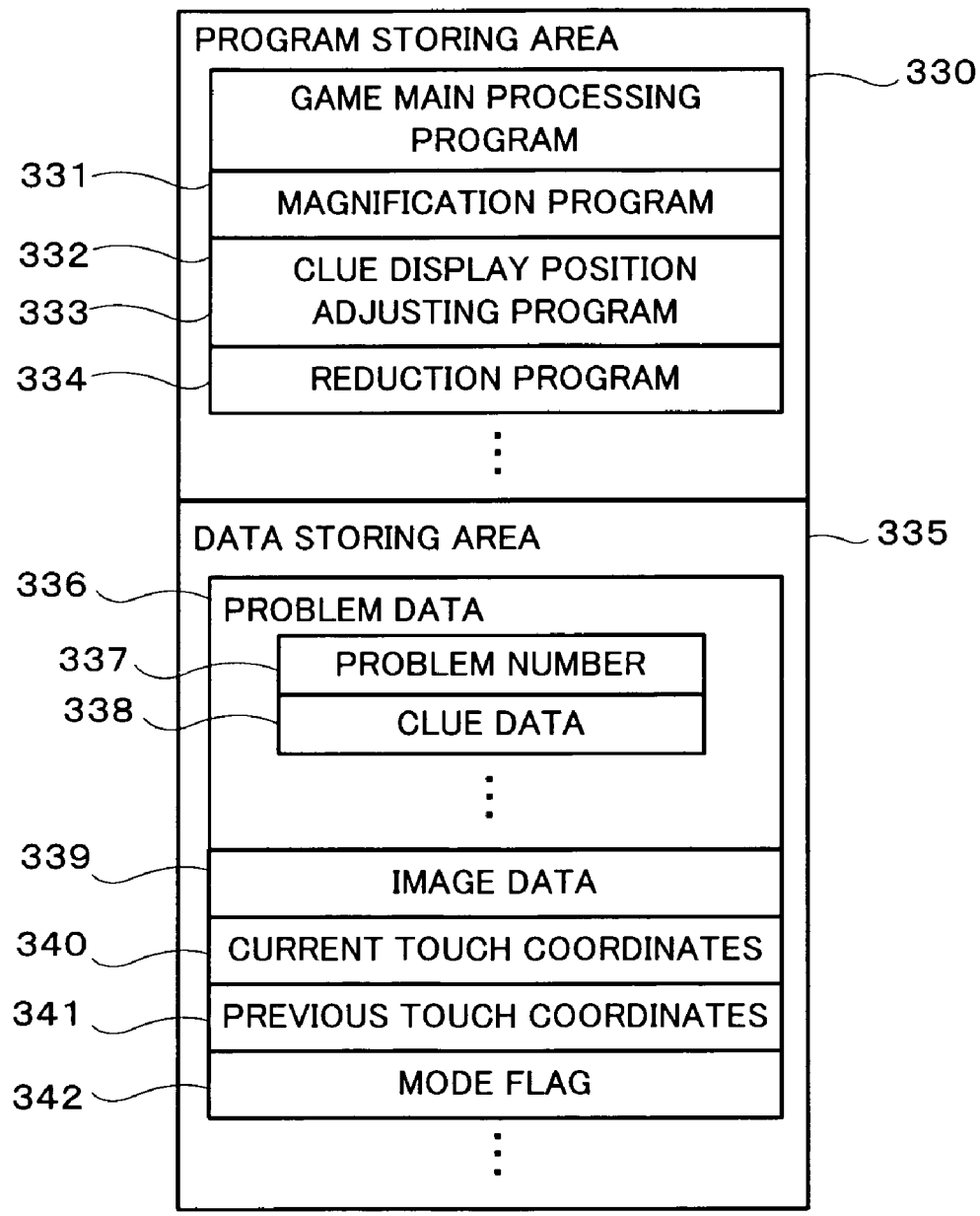
FIG. 7 is a diagram illustrating a memory map of a RAM 37 of FIG. 2.

Next, various data used in this embodiment will be described. FIG. 7 is a diagram illustrating a memory map of the RAM 37 of FIG. 2. In FIG. 7, the RAM 37 includes a program storing area 330 and a data storing area 335. The program storing area 330 stores a game program which is executed by the CPU 31. The game program includes a game main processing program 331, a magnification program 332, a clue display position adjusting program 333, a reduction program 334, and the like.

The data storing area 335 stores problem data 336, image data 339, current touch coordinates 340, previous touch coordinates 341, a mode flag 342, and the like.

The problem data 336 includes problem numbers 337 and clue data 338. The problem number 337 is an ID for identifying a corresponding problem. The clue data 338 is data of clue numbers corresponding to a corresponding problem.

Figure 8:
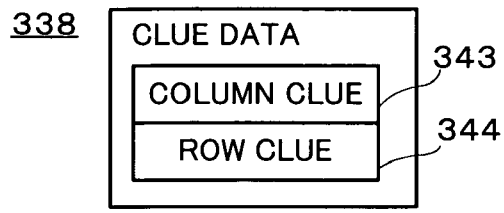
FIG. 8 is a diagram illustrating an exemplary data structure of clue data 338 of FIG. 7.
Figure 9:
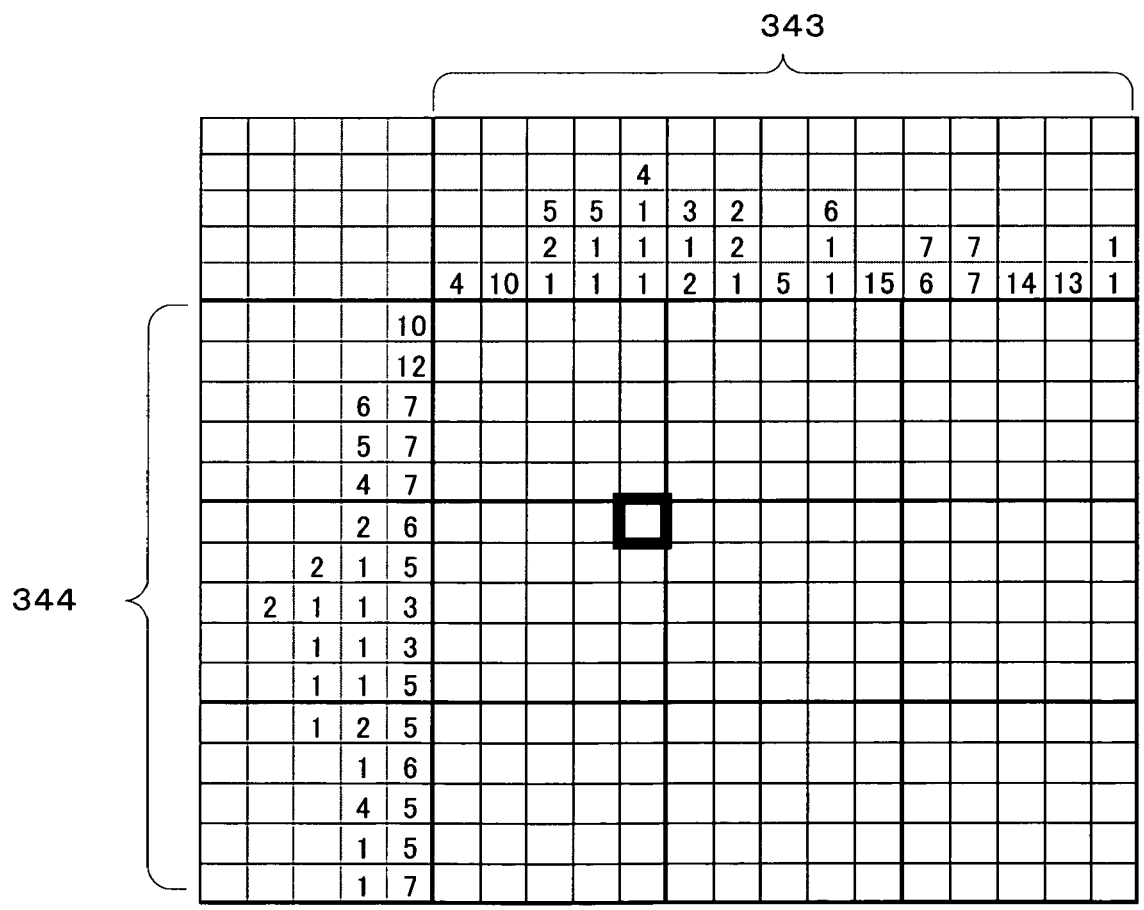
FIG. 9 is a diagram for describing a column clue and a row clue.

FIG. 8 is a diagram illustrating an exemplary data structure of the clue data 338. The clue data 338 includes a set of a column clue 343 and a row clue 344. The column clue 343 is data of clue numbers for columns (see FIG. 9). The row clue 344 is data of clue numbers for rows (see FIG. 9).

FIG. 10 is a diagram illustrating an exemplary data structure of the column clue 343. The column clue 343 include sets of a column number 3431, the number of clues 3432, and a clue value nA 3433 to a clue value nE 3437, where n is an integer which is the number n of columns or rows set for each problem. The column number 3431 indicates a position of a clue in an ordered column sequence. The number of clues 3432 indicates the number of clue numbers. In this embodiment, the number of clues is assumed to be five at maximum. The clue values 3433 to 3437 each indicate a corresponding one of clue numbers. For example, when a clue for the first column is "4 1 1 1", the number of clues 3432 is set to be 4, the clue value 1A is set to be 4, the clue value 1B is set to be 1, the clue value 1C is set to be 1, the clue value 1D is set to be 1, and the clue value 1E is set to be blank. When a clue is "10 1", the number of clues 3432 is 2, the clue value 1A is set to be 10, the clue value 1B is set to be 1, and the other clue values are set to be blank.

FIG. 11 is a diagram illustrating an exemplary data structure of the row clue 344. The row clue 344 includes a row number 3441, the number of clues 3442, and a clue value nA 3443 to a clue value nE 3447, where n is an integer which is the number n of columns or rows set for each problem. The row number 3441 indicates a position of a clue in an ordered row sequence. The number of clues 3442 indicates the number of clue numbers. In this embodiment, the number of clues is assumed to be five at maximum. The clue values 3443 to 3447 each indicate a corresponding one of clue numbers.

The image data 339 includes image data of the above-described normal background and large background, or the like.

The current touch coordinates 340 and the previous touch coordinates 341 are data for storing coordinates on the touch panel 16 touched by the player.

The mode flag 342 is a flag which indicates a display mode. In the game of this embodiment, there are two display modes: a "normal mode" in which the entirety of a puzzle game region is displayed (see FIG. 3); and a "magnification mode" in which a portion of the region is magnified and displayed (see FIG. 4).

Next, the puzzle game process executed by the hand-held game apparatus 10 will be described with reference to FIGS. 12 to 20. Initially, when the hand-held game apparatus 10 is powered ON, the CPU 31 of the hand-held game apparatus 10 executes a startup program stored in a boot ROM (not shown), and initializes each unit, such as the RAM 37 and the like. Thereafter, the puzzle game program and various data stored in the memory card 18 are read via the connector 33 into the RAM 37, and execution of the puzzle game program is started.

Figure 12:
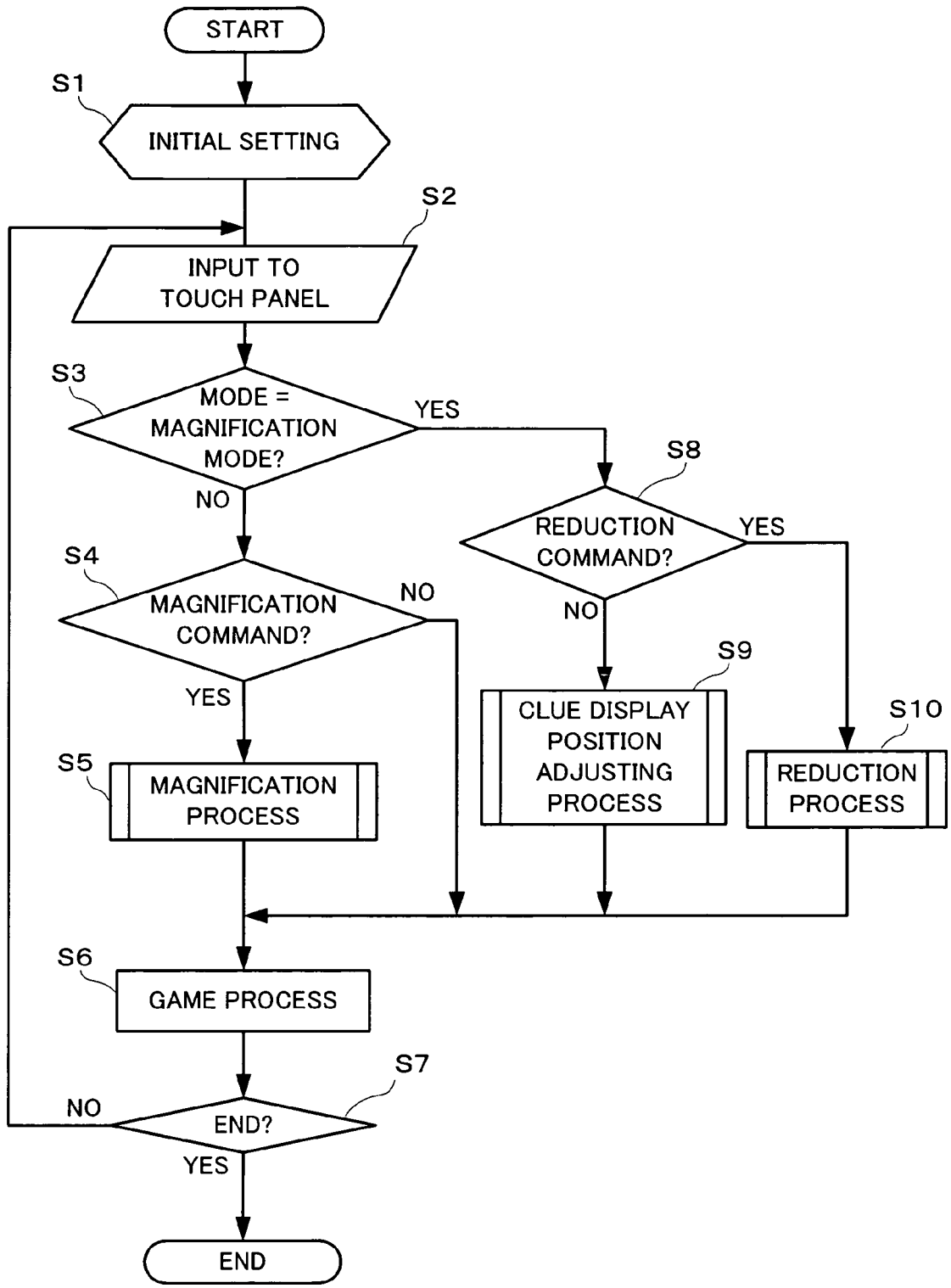
FIG. 12 is a flowchart of a main routine indicating a whole operation of the hand-held game apparatus 10 of the first exemplary embodiment.

FIG. 12 is a flowchart illustrating the whole puzzle game process which is executed by the hand-held game apparatus 10. In FIG. 12, initially, the CPU 31 executes an initial setting process (step S1). In the initial setting process, the problem data 336 is read, and thereafter, the image data 339 of a normal background and a large background corresponding to the problem is read. Further, the CPU 31 sets the mode flag 342 to be "normal". Thereafter, the normal background is displayed on the screen.

Next, the CPU 31 obtains input data from the touch panel 16 (step S2). If the touch panel 16 has been touched, touched coordinates (on the touch panel 16) are obtained and stored into the current touch coordinates 340. If the touch panel 16 has not been touched, the current touch coordinates 340 are cleared.

Next, the CPU 31 determines whether or not the mode flag 342 is "magnification" (step S3). Specifically, it is determined whether the game is currently played in a state in which the normal background is displayed (hereinafter referred to as a normal mode) or in a state in which the large background is displayed (hereinafter referred to as a magnification mode).

As a result of the determination in step S3, when the mode flag 342 is not "magnification" (NO in step S3), the game is currently played in the normal mode. In this case, next, it is determined whether or not the player has issued a screen magnification command (step S4). For example, the magnification command is issued by the player pressing a screen magnification command button (not shown).

As a result of the determination in step S4, when the magnification command has not been issued (NO in step S4), the CPU 31 causes the process to go to step S6 described below. On the other hand, when the magnification command has been issued (YES in step S4), the CPU 31 displays a magnifying glass mark on the screen, and goes to a process of next step S5. Note that the magnifying glass mark is displayed to prompt the player to designate a point which the player wants to magnify. In other words, the player issues a magnification command, and after the magnifying glass mark is displayed, touches a square which the player wants to magnify.

Next, the CPU 31 executes a magnification process. In this process, the screen around a point (magnification center point) designated by the player is magnified. The normal background is subjected to the magnification process, so that an animation is displayed which shows that the normal ground is gradually magnified. When a predetermined magnification factor is finally reached, a process of changing the normal background to the large background is executed as described above.

Figure 13:
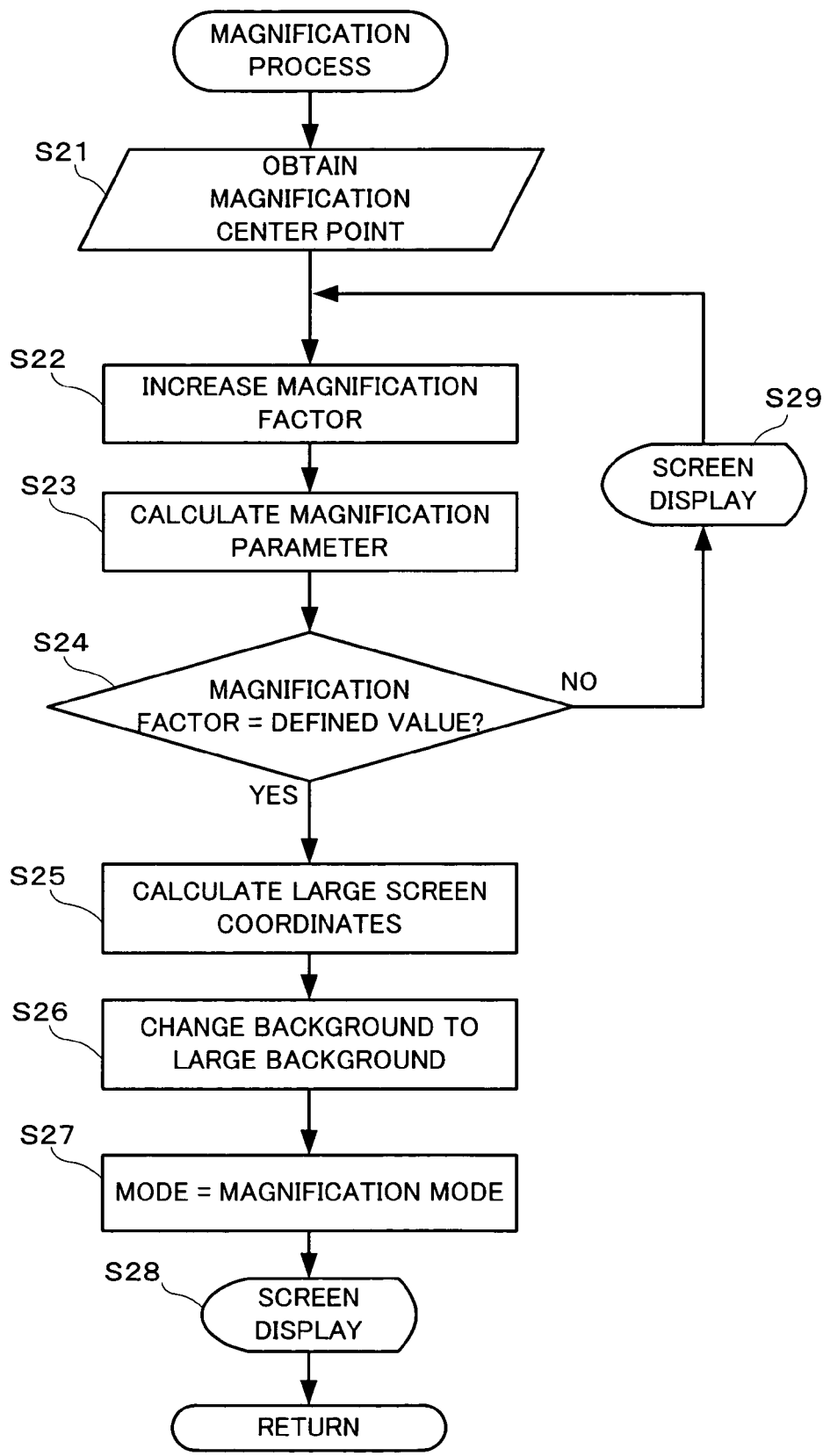
FIG. 13 is a flowchart illustrating a magnification process of step S5 of FIG. 12.

FIG. 13 is a flowchart illustrating details of the magnification process of step S5. In FIG. 13, initially, the CPU 31 obtains coordinates of the magnification center point (step S21). The magnification center point refers to a position of a square which is designated by the player when the magnifying glass mark is displayed. Therefore, the coordinates of the magnification center point are the coordinates of a center portion of the square on the normal background. In the magnification process, the normal background is magnified in a manner which prevents the magnification center point from being moved in the sight of the player. This is because, if the position designated by the player is moved during the magnification process, the player is likely to lose sight of the square designated by the player. Therefore, the magnification process is executed in a manner which prevents movement of the position of the square on the screen, thereby preventing the player from losing sight of the square designated by the player. Therefore, it seems to the player that surroundings of the square designated by the player are extended toward the outside from the designated square as a center, i.e., the background is magnified.

Next, the CPU 31 adds a predetermined value to the magnification factor of the normal background (step S22). Specifically, for example, assuming that the magnification factor of the normal background which is not magnified is 1.0, a value of 0.1 is added. As a result, the magnification factor of the normal background becomes 1.1.

Next, the CPU 31 calculates a magnification parameter from the magnification center point and the current magnification factor (step S23). The magnification parameter is used to define a display position on the screen of the normal background during magnification. In other words, the magnification parameter is a parameter for defining a display content corresponding to each frame of an animation of the magnification.

For example, the magnification parameter is calculated by:

a next pixel reference direction X of the normal background=1.0/the magnification factor;

a next pixel reference direction Y of the normal background=0;

a next line movement amount X of the normal background=0;

a next line movement amount Y of the normal background=1.0/the magnification factor;

a reference start point X of the normal background=a magnification center point X−a magnification center point X/the magnification factor; and a reference start point Y of the normal background=a magnification center point Y−a magnification center point Y/the magnification factor.

Next, the CPU 31 determines whether or not the magnification factor has reached a predetermined value (step S24). In the above-described case, the predetermined value is 2.0 (the normal background: 256×192 dots; and the large background: 512×384 dots, which are two times larger than that of the normal background). As a result of the determination, when the magnification factor has not reached the predetermined value (NO in step S24), the normal background magnified based on the magnification factor calculated in step S22 is displayed on the screen at a display position defined based on the magnification parameter (step S29). Thereafter, the CPU 31 returns to the process of step S22. In other words, the normal background is repeatedly magnified by a factor of 0.1 and displayed until the magnification factor reaches 2.0. Note that the process loop of steps S22 to S24 and S29 is repeated on a frame-by-frame basis.

Figure 15:
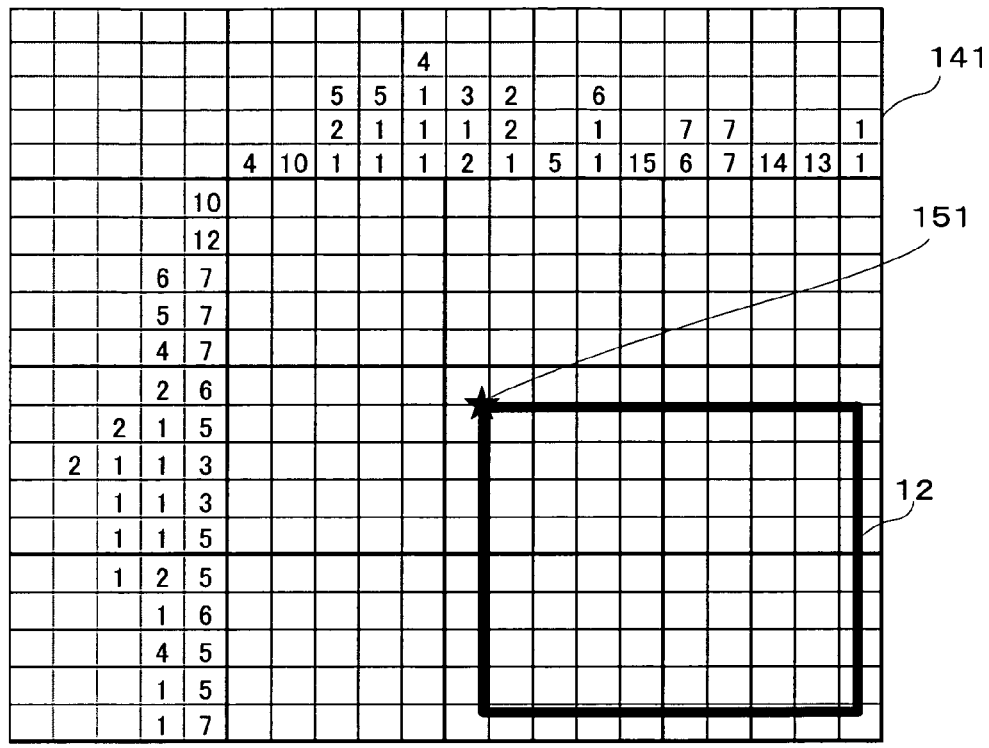
FIG. 15 is a diagram for describing large screen coordinates.
Figure 16:
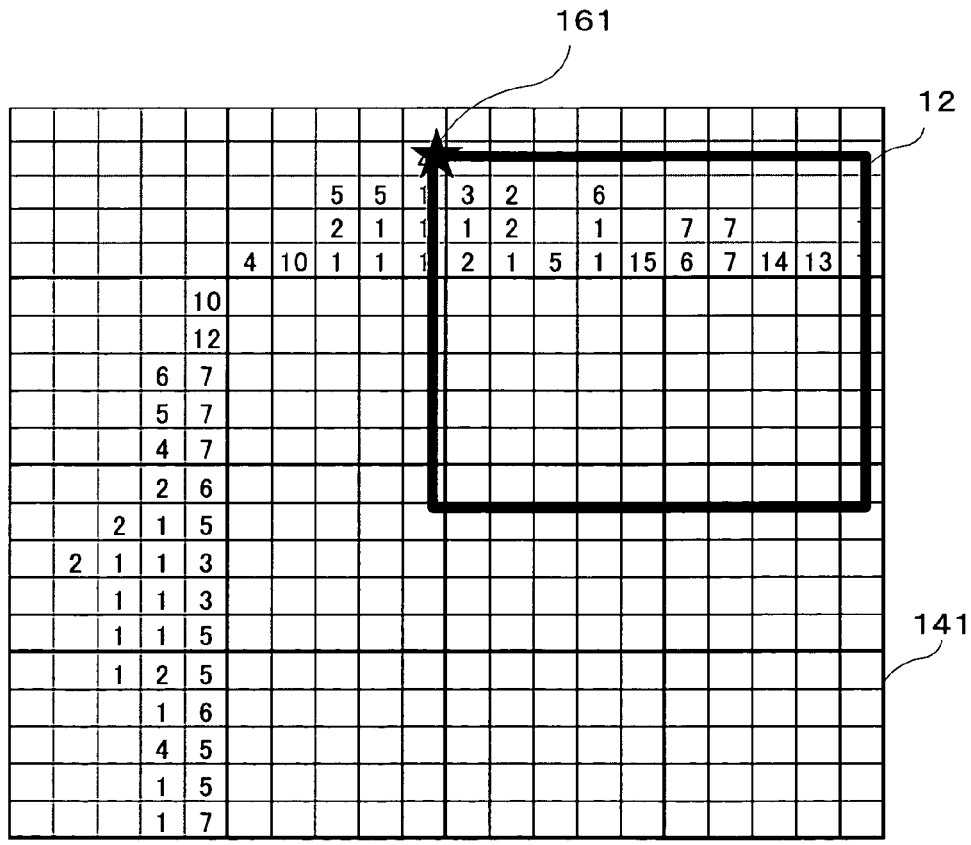
FIG. 16 is a diagram for describing large screen coordinates.

On the other hand, if the magnification factor has reached the predetermined value (YES in step S24), then the CPU 31 calculates large screen coordinates (step S25). Here, the large screen coordinates will be described with reference to FIGS. 14 to 16. The large screen coordinates are coordinates for displaying a portion of the large background which is displayed on the screen, without a sense of awkwardness even when the normal background is changed to the large background. In FIG. 14, there are a large background 141 (512× 384 dots), and a screen (i.e., the second LCD 12 (256×192 dots)). When a lower right portion of the large background 141 is displayed on the LCD 12 as illustrated in FIG. 15, coordinates 151 corresponding to an upper left end of the LCD 12 are large screen coordinates. When an upper right portion is displayed as illustrated in FIG. 16, coordinates 161 are large screen coordinates. In other words, coordinates on the large background corresponding to the upper left end of the LCD 12 are large screen coordinates.

For example, the large screen coordinates can be calculated by:

a large screen coordinate X=the magnification center point X×(the magnification factor−1); and a large screen coordinate Y=the magnification center point Y×(the magnification factor−1).

If calculation of the large screen coordinates is finished, then the CPU 31 changes a background to be displayed on the screen from the normal background to the large background (step S26). Next, the CPU 31 sets the mode flag 342 to be "magnification" (step S27). Thereafter, the CPU 31 executes screen display (step S28). As a result, the large background is displayed. On the screen, a region of the large background including a square designated by the player is displayed. Thus, the magnification process is completed.

Referring back to FIG. 12, following the process of step S4 or S5, the CPU 31 executes the game process (step S6). Here, processes involved with progression of the game, such as setting or resetting of a black square based on an input by the player, determining of whether or not a clear condition is satisfied, or the like, are executed. Note that, since this embodiment mainly relates to a process for screen display, details of the game process will not be described.

After the process of step S6, it is determined in step S7 whether or not the game is ended. When the result of the determination is YES, the puzzle game of this embodiment is ended. When the determination result is NO, the CPU 31 returns to step S2, and repeats the puzzle game process.

Next, a puzzle game process when the mode flag 342 is "magnification" as a result of the determination in step S3 (YES in step S3), i.e., when the large background is displayed (magnification mode), will be described. In this case, the CPU 31 determines whether or not a reduction command has been issued (step S8). For example, the reduction command is issued when the player presses a screen reduction command button (not shown).

As a result of the determination in step S8, when a reduction command has not been issued (NO in step S8), the CPU 31 executes a clue display position adjusting process (step S9). In this process, as described above, a process of displaying clue numbers for a square of interest and squares on both adjacent sides thereof on the screen is executed.

Figure 17:
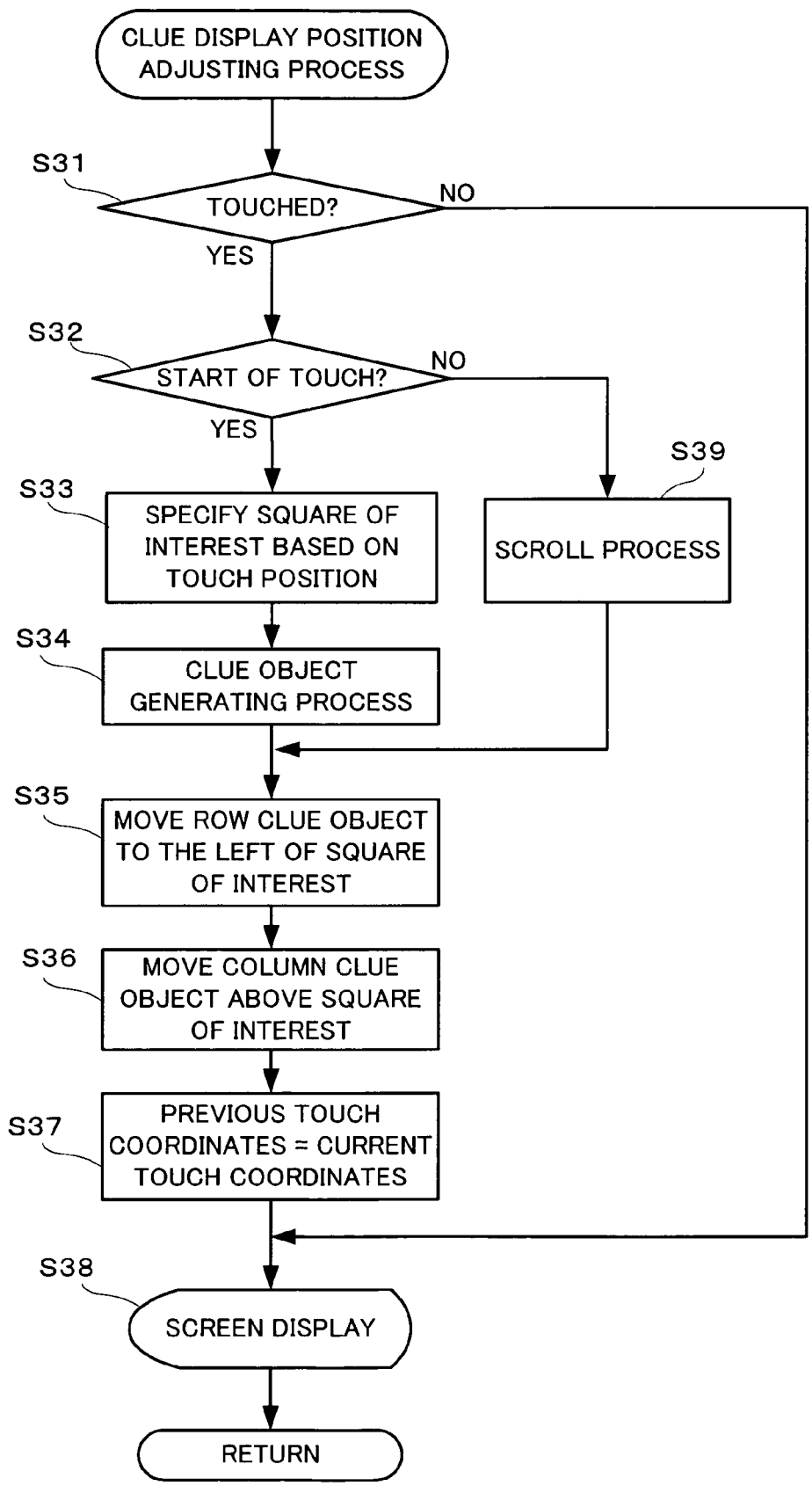
FIG. 17 is a flowchart illustrating a clue display position adjusting process of step S9 of FIG. 12.

FIG. 17 is a flowchart illustrating details of the clue display position adjusting process of step S9. In FIG. 17, initially, it is determined whether or not a touch input has been done (step S31). In other words, it is determined whether or not there has been any input data in step S2. Specifically, it is determined whether or not there is any data stored in the current touch coordinates 340. As a result of the determination, when a touch input has not been done (NO in step S31), the CPU 31 goes to a process of step S38 below, in which screen display is executed, and then the clue display position adjusting process is ended.

As a result of the determination in step S31, when a touch input has been done (YES in step S31), it is determined whether or not the touch input is the start of a touch operation, i.e., a touch-ON operation (step S32). As a result of the determination, when the touch input is the start of a touch operation (YES in step S32), coordinates of a square of interest are calculated from the current touch coordinates 340 (step S33). More specifically, the current touch coordinates 340 are converted into screen coordinates, and coordinates of a square on the large background corresponding to the screen coordinates are calculated. In other words, during the touch-ON operation, the square of interest is specified.

Next, the CPU 31 converts clue numbers corresponding to the specified square of interest and clue numbers corresponding to squares immediately adjacent to, and above and below or to the left and right of, the square of interest, into objects (clue object generating process) (step S34). The process of step S34 will be described more specifically. Initially, the CPU 31 searches the row clue 344 for a row number 3441 corresponding to a row number corresponding to the coordinates of the square of interest. Thereafter, the number of clues 3442 of the row number 3441 is obtained. Next, clue values 3443 to 3447 are read in accordance with the number of clues 3442. Thereafter, the clue values thus read are generated as objects. For example, when a clue is "5 2 1", three clue objects "5", "2" and "1" are generated. Thereafter, the generated clue objects are disposed, overlapping positions of corresponding clue numbers on the large background. Further, clue values 3443 to 3447 for rows on both adjacent sides of the square of interest are read, and are similarly generated as objects, which are in turn disposed on the large background. Next, the CPU 31 searches the column clue 343 for a column number 3431 corresponding to a column number corresponding to the coordinates of the square of interest. Thereafter, as with the row number, clue values 3433 to 3437 are read in accordance with the number of clues 3432, and are converted into objects, which are in turn disposed on the large background. Clue values for columns on both adjacent sides of the square of interest are similarly converted into objects, which are in turn disposed on the large background. Next, portions of the large background which overlaps the clue number objects are erased from the large background. This is because the visibility is prevented from being deteriorated due to double display.

Figure 18:
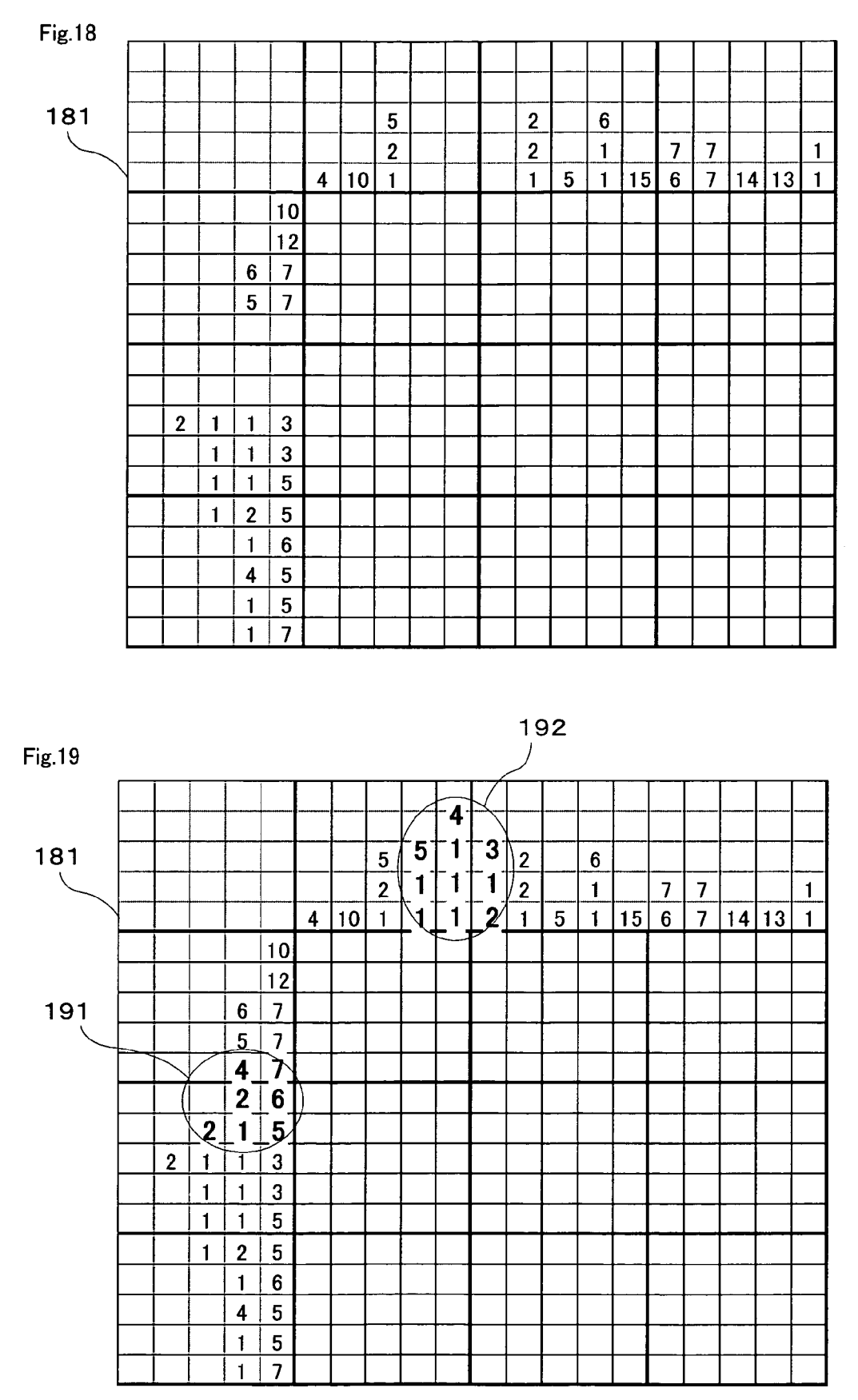

FIGS. 18 and 19 are diagrams illustrating clue objects and the large background. In FIG. 18, portions of the clue numbers which have been converted into objects are erased from a large background 181. Thereafter, as illustrated in FIG. 19, row clue objects 191 and column clue objects 192 are provided at the erased positions (note that each clue object is slightly enlarged in FIG. 19 for the sake of easy understanding). Therefore, in this case, the clue numbers look the same as before converted into objects. Note that, since the clue objects 191 and 192 are objects, the clue objects 191 and 192 can be freely moved on the large background 181.

Referring back to FIG. 17, next, the CPU 31 executes a process of moving the row clue objects 191 into the screen, of the clue objects generated in step S34 (step S35). Specifically, clue numbers corresponding to a square of interest and squares on rows immediately adjacent to and above and below the square of interest are displayed on the screen. The process of step S35 will be more specifically described. Initially, the CPU 31 obtains the X coordinate of the position of a leftmost object (corresponding to a clue value 3443) of the row clue objects 191 for the square of interest. Thereafter, it is determined whether or not the X coordinate is smaller than the X coordinate of the large screen coordinates. In other words, it is determined whether or not the leftmost object of the row clue objects 191 for the square of interest is outside a display region. As a result, if the leftmost object is outside the display region, the X coordinate of the position of the leftmost clue object is changed to the X coordinate of the large screen coordinates. In other words, the leftmost clue object which has been outside the display region, is moved to a leftmost position of the display region. Thereafter, remaining clue objects (clue values 3444 to 3447) on the row of the square of interest are moved so as to be successively disposed on the right side of the leftmost object. Further, clue objects on rows on both adjacent sides of the square of interest are similarly moved so as to be displayed at a left end of the display region. On the other hand, if the leftmost clue object is within the display region, the above-described process is not executed, and step S35 is ended without executing the process thereof.

Next, the CPU 31 executes a process of moving the column clue objects 192 into the screen, of the clue objects generated in step S34 (step S36). Specifically, clue numbers corresponding to the square of interest and squares on columns immediately adjacent to, and to the left and right of, the square of interest are displayed on the screen. The process of step S36 is the same as the process of step S35, except that the process is executed with respect to columns instead of rows. Specifically, it is determined whether or not the Y coordinate of an uppermost object (corresponding to a clue value 3433) of the column clue objects 192 for the square of interest is larger than the Y coordinate of the large screen coordinates, thereby determining whether the uppermost object is outside or inside the display region. As a result, if the uppermost object is outside the display region, the position of the uppermost clue object is changed to the Y coordinate of the large screen coordinates. Thereafter, remaining clue objects are moved so as to be successively disposed downward. Further, clue objects for columns on both adjacent sides of the square of interest are subjected to a similar process. Thereby, the column clue objects are moved into the display region.

Next, the CPU 31 updates the previous touch coordinates 341 into the current touch coordinates 340 (step S37). Thereafter, screen display is performed so that the large screen coordinates are positioned at the upper left end of the screen (step S38). Thereby, the screen as illustrated in FIG. 5 is displayed.

On the other hand, as a result of the determination in step S32, when the touch input is not the start of a touch operation (NO in step S32), the stylus pen 17, a finger, or the like continues to touch the touch panel, so that the screen is scrolled in accordance with movement of the stylus pen 17 or the finger (step S39). More specifically, initially, differences between the current touch coordinates 340 and the previous touch coordinates 341 are calculated. Thereafter, the differences are subtracted from the large screen coordinates, thereby updating the large screen coordinates. Thereafter, the processes on and after step S35 are executed. Thus, the clue display position adjusting process is completed.

Referring back to FIG. 12, if the process of step S9 is finished, the CPU 31 goes to the process of step S6. On the other hand, as a result of the determination in step S8, when a reduction command has been issued (YES in step S8), the large background is changed to the normal background (reduction process) (step S10). In this process, a process reverse to the magnification process of step S5 is executed. Specifically, initially, the large background is changed to a normal background which is magnified by a factor of 2. Thereafter, it is displayed how the normal background is reduced into predetermined magnification factors, and finally, a normal background having a magnification factor of 1.0 is displayed.

Figure 20:
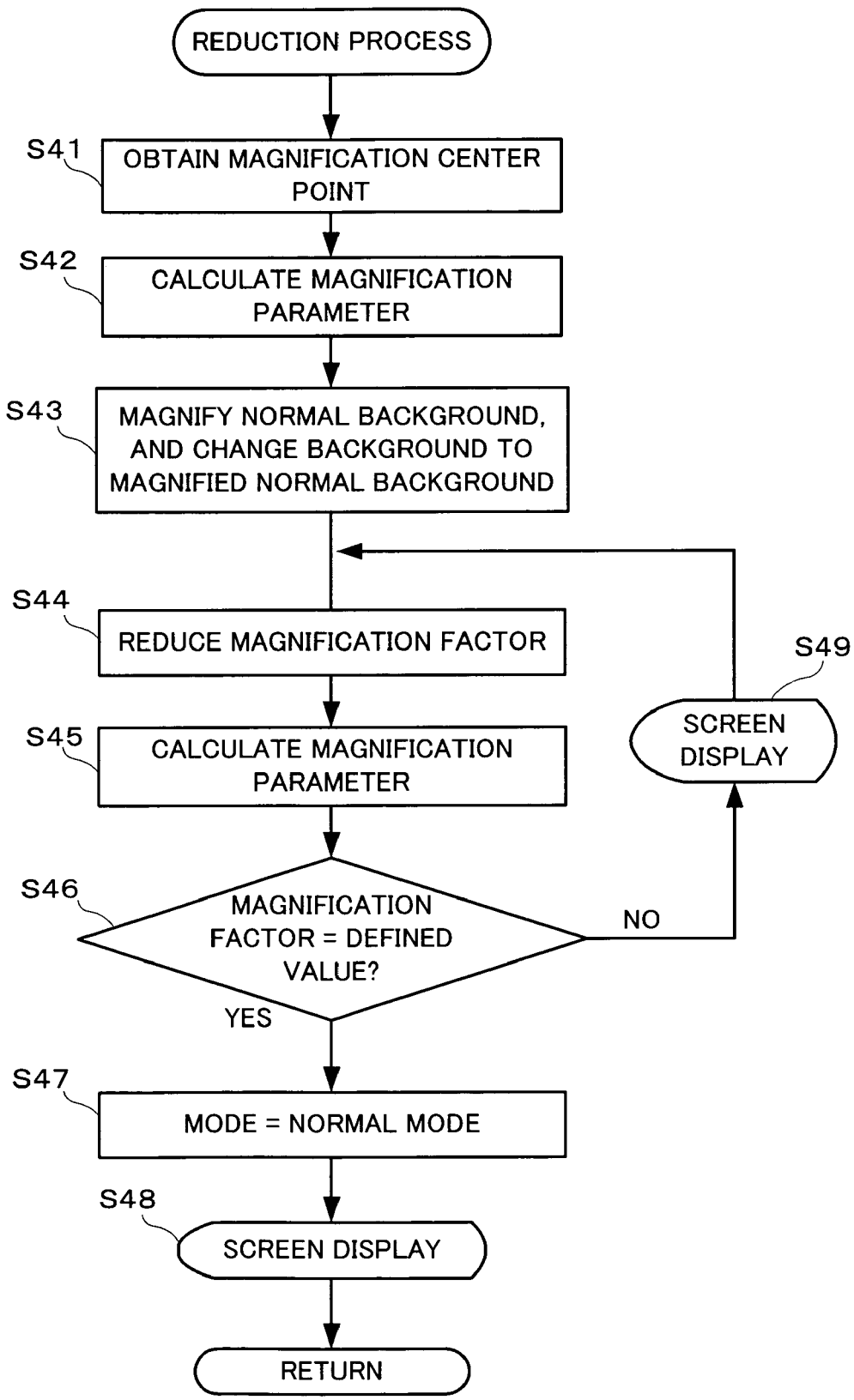
FIG. 20 is a flowchart illustrating a reduction process of step S10 of FIG. 12.

FIG. 20 is a flowchart illustrating details of the reduction process of step S10. In FIG. 20, initially, a magnification center point is calculated based on current large screen coordinates and a magnification factor (2.0 in the above-described example) upon the end of the magnification process of step S5 (step S41). Specifically, the magnification center point is calculated by:

a magnification center point X=a large screen coordinate X/(a magnification factor−1); and a magnification center point Y=a large screen coordinate Y/(the magnification factor−1).

Next, the CPU 31 calculates a magnification parameter (step S42). This process is similar to that of step S23, and therefore, will not be described in detail.

Next, the CPU 31 magnifies the normal background based on the magnification factor. Thereafter, a background which is displayed on the screen is changed from the large background to the magnified normal background (step S43).

Next, the CPU 31 subtracts a predetermined value (e.g., 0.1) from the magnification factor of the normal background (step S44).

Next, a magnification parameter is calculated based on a current magnification factor and the magnification center point calculated in step S41 (step S45). This process is also similar to that of step S23, and therefore, will not be described in detail.

Next, the CPU 31 determines whether or not the magnification factor has reached a predetermined value (step S46). The predetermined value is 1.0, i.e., a value indicating "no magnification" or "original size". As a result of the determination, when the normal background has not been reduced to the original size (NO in step S46), a normal background which is reduced based on the magnification factor calculated in step S44 is displayed on the screen at a display position defined based on the magnification parameter (step S49). Thereafter, the CPU 31 returns to the process of step S44. In other words, the normal background is repeatedly reduced by a factor of 0.1 until the magnification factor reaches 1.0. Note that the process loop of steps S44 to S46 and S49 is executed on a frame-by-frame basis.

On the other hand, when the normal background has been reduced to the original size (YES in step S46), then the CPU 31 sets the mode flag 342 to be "normal" (step S47). Thereafter, the CPU 31 performs screen display (step S48). As a result, the normal background is displayed in the original size. Thus, the reduction process is completed.

Referring back to FIG. 12, if the reduction process of step S10 is finished, the CPU 31 causes the process to go to step S6. The subsequent processes are the same as described above, and therefore, will not be described.

Thus, the puzzle game process of this embodiment is completed.

As described above, in this embodiment, the normal background is magnified to a size larger than the size of the screen, and a portion thereof is displayed on the screen. In this case, clue numbers for a square of interest displayed on the screen can be invariably displayed on the screen. Therefore, in addition to good visibility and operability due to the magnified screen, information about the square of interest can be easily recognized, thereby making it possible to provide a comfortable game play environment to a player.

Also, it is possible to generate a paint by numbers puzzle having a large region without worrying about the resolution or size of the screen. In other words, although the size of the region of a paint by numbers puzzle is conventionally substantially limited due to balance between the resolution and the visibility of the screen, the exemplary embodiments described herein make it possible to utilize a large region to provide an advanced and profound game content without worrying about the size of the region of a paint by numbers puzzle.

When a clue object is generated, a corresponding portion of clue numbers is erased from the large background, thereby making it possible to prevent a deterioration in visibility due to double display of clue numbers.

Clue numbers for squares around a square of interest are also displayed at an end of the screen (large screen coordinates), thereby making it possible to cause a player to recognize the meanings and contents of the squares around the square of interest.

Note that, when clue numbers are converted into objects in step S34, a character size or a character color of the clue number may be changed. Thereby, the visibility of the clue number can be increased.

Although clue numbers for three rows and three columns are converted into objects, which are in turn displayed on the screen, in the above-described exemplary embodiment, the exemplary embodiments are not limited to this. Only clue numbers for one row and one column for a square of interest may be displayed. Clue numbers for three or more rows and three or more columns may be displayed. The number of rows and the number of columns of clue numbers which are converted into objects may be changed, depending on the development of a game. Thereby, clues can be flexibly displayed, thereby making it possible to increase the operability and the visibility for a player.

In the above-described embodiment, a square of interest is specified upon performance of a touch-ON operation in the magnification mode. Thereafter, even when a screen scroll operation is performed while the stylus pen 17 or the like continues to touch, a square of interest which has once been specified is not changed unless a touch-OFF operation is performed. The exemplary embodiments are not limited to this. Alternatively, the position of the square of interest may be changed even when a touch-OFF operation is not performed. For example, when the screen is scrolled up to an end of the large background, so that the screen is not further scrolled, a position at which the stylus pen 17 touches the screen may be set to be a square of interest until scrolling of the screen is resumed. More specifically, a scroll amount of the screen maybe determined, and when the scroll amount reaches 0 (i.e., the screen is scrolled up to an end of the large background), a square corresponding to the current touch coordinates 340 which are obtained on a frame-by-frame basis may be set to be a square of interest. Alternatively, when a square other than a square of interest comes to a position at which the stylus pen 17 touches the screen by scrolling the screen, the square may be set to be a new square of interest. In this case, a square corresponding to the current touch coordinates 340 which are obtained on a frame-by-frame basis may be invariably set to be a square of interest.

Although the hand-held game apparatus comprising two display devices has been described as an example in this exemplary embodiment, certain exemplary embodiments can be applied to a hand-held terminal comprising a single display device on which a touch panel is provided. The exemplary embodiments are not limited to hand-held terminals, and can be applied to a stationary television game machine or a desk-top personal computer. In this example, a touch panel has been described as an exemplary device for detecting a position designated by a player with respect to an operation region. Alternatively, any so-called pointing device which enables a player to designate a position in a predetermined region can be used. For example, a mouse with which any position on a screen can be designated, or a tablet with which any position on an operation surface which does not have a display screen can be designated, may be used. A device comprising an image capturing means for capturing an image of a marker or the like provided on a display screen or around the display screen from a remote distance, may also be used to calculate coordinates on the display screen corresponding to a position designated on the display screen based on a position of the display screen or the marker in the captured image obtained by pointing a direction. Alternatively, a cursor may be displayed on the screen, and by changing a position of the cursor by operating a cross key, an analog stick or the like, any position (square) may be designated.

Although a paint by numbers puzzle game has been described as an example in the above-described exemplary embodiment, the exemplary embodiments described herein not limited to such a game. For example, the exemplary embodiments can be applied to, for example, an information process of displaying on a screen a fee table for tollways or trains, a score table for sports matches, or the like. FIGS. 21 and 22 are diagrams for describing a fee table for a tollway to which the exemplary embodiments are applied. For example, as illustrated in FIG. 21, when only a portion of the tollway fee table is magnified and displayed, only fees are displayed, so that it is difficult to recognize to what places (departures and destinations) the fees correspond. Even in such a case, by applying the exemplary embodiments described herein, places (entries) 221 are displayed as illustrated in FIG. 22, so that it is easy to recognize to what places (departures and destinations) the fees correspond. Thus, when a portion of a region in a tabular form is displayed on a screen, an entry for a square is invariably displayed on the screen, thereby making it possible to recognize the meaning or content of the square, and increase the visibility and the operability.

Regarding a region in a tabular form, although entries (clue numbers or places) are set for each of rows and columns in the above-described examples, a tabular form in which entries are set only for either rows or columns may be used. Also, although entries are provided on the top and left sides of the grid in the above-described example, a tabular form in which entries are provided on the bottom and (or) right sides of the grid may be used.

Also, in this embodiment, when a square of interest is specified, the clue object generating process is performed. Alternatively, the clue object generating process may be performed after determining that a clue number for a specified square of interest is outside the display region. Specifically, when a player designates any square (a square of interest is specified), coordinates of clue numbers related to the designated square may be obtained (entries are obtained). When the coordinates thus obtained are outside the display region, the clue numbers may be converted into objects, and the coordinates may be changed so as to be displayed in the display region (entry display).

Also, in the screen magnification process of this embodiment, magnification is performed while fixing the position on the screen of a square designated by a player. Alternatively, magnification may be performed while the square designated by the player is placed on a center of the screen. In this case, surroundings of the square (magnification center point) designated by the player can be equally recognized.

While certain exemplary embodiments have been described in detail, the foregoing detailed description is in all aspects illustrative and not restrictive. It is understood that numerous other modifications and variations can be devised without departing from the scope of these certain exemplary embodiments.

What is claimed is:

1. A non-transitory computer-readable storage medium storing an information processing program which is executed by a computer of an information processing apparatus for displaying on a screen of a display device at least a part of an entire region in which a plurality of entries and a plurality of squares related to the respective entries are represented in a tabular form, the information processing program causing the computer to execute:

designating any square from the plurality of squares;
displaying on the screen only a portion of the entire region including the designated square;
obtaining the entry related to the designated square; and
displaying the obtained entry obtained in association with a display position of the designated square.

2. The storage medium according to claim 1, wherein displaying the obtained entry includes displaying the obtained entry at least either above or to the left of the display position of the designated square.

3. The storage medium according to claim 1, wherein the information processing program causes the computer to further execute:

determining whether or not the obtained entry is within the partial region,
wherein displaying the obtained entry includes moving the entry into the partial region when it is determined that the entry is not within the partial region.

4. The storage medium according to claim 1, wherein obtaining the entry related to the designated square includes obtaining the entries related to squares adjacent to, and above and below or to the left and right of, the designated square, and displaying the obtained entry includes displaying the entry related to the designated square and the adjacent entries.

5. The storage medium according to claim 1, wherein the displaying the obtained entry includes changing a character size or a character color of the obtained entry and displaying the resultant entry.

6. The storage medium according to claim 1, wherein designating any square from the plurality of squares includes designating the predetermined square based on designated coordinates corresponding to a position designated by a player on a touch panel provided on the screen of the display device.

7. The storage medium according to claim 1, wherein the obtaining the entry related to the designated square includes erasing a portion of the entry related to the designated square from the entire region.

8. The storage medium according to claim 1, wherein the displaying the obtained entry includes displaying the entry in a manner which disposes the entry along an upper end or a left end of the screen.

9. The storage medium according to claim 1, wherein an information process executed by the information processing program is a paint by numbers puzzle game, the entire region is a paint by numbers puzzle, and the entry is clue information for solving the paint by numbers puzzle.

10. An information processing apparatus for displaying on a screen of a display device at least a part of an entire region in which a plurality of entries and a plurality of squares related to the respective entries are represented in a tabular form, the apparatus comprising:
- a designation input section for inputting a designation for designating any square from the plurality of squares;
- a partial region displaying section for displaying on the screen only a portion of the entire region including the designated square;
- an entry obtaining section for obtaining the entry related to the square designated in the designation section; and
- an entry displaying section for displaying the entry obtained in the entry obtaining section in association with a display position of the designated square.

\* \* \* \* \*